US012709129B1

(12) United States Patent
Lee et al.

(10) Patent No.: US 12,709,129 B1
(45) Date of Patent: Aug. 18, 2026

(54) SELF-PRESSURIZING AIR SUSPENSION SYSTEM

(71) Applicant: GM Global Technology Operations LLC, Detroit, MI (US)

(72) Inventors: Kyoungtaek Lee, White Lake, MI (US); Robert W. Nantau, Metamora, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 19/336,115

(22) Filed: Sep. 22, 2025

(51) Int. Cl.
*B60G 17/052* (2006.01)
*B60G 11/58* (2006.01)

(52) U.S. Cl.
CPC .......... *B60G 17/0528* (2013.01); *B60G 11/58* (2013.01); *B60G 2202/152* (2013.01); *B60G 2500/2041* (2013.01)

(58) Field of Classification Search
CPC .................................................. B60G 17/0523
See application file for complete search history.

(56) References Cited

U.S. PATENT DOCUMENTS 6,547,224 B2 * 4/2003 Jensen ...................... F16F 9/05 267/DIG. 2
6,698,778 B2 * 3/2004 Roemer ................. B60G 11/27 280/124.159
7,942,427 B2 * 5/2011 Lloyd ....................... F16F 9/04 280/5.514
10,179,496 B1 * 1/2019 Vaughan ............ B60G 17/0162
2003/0067103 A1 * 4/2003 Easter ................ B60G 17/0528 267/64.11
2004/0201146 A1 * 10/2004 Behmenburg ..... B60G 17/0416 267/64.11
2009/0194179 A1 * 8/2009 Morris ............... B60G 17/0525 137/625.11
2010/0259018 A1 * 10/2010 Honig ................ B60G 17/0521 280/5.514

(Continued)

FOREIGN PATENT DOCUMENTS

DE 1048166 B 12/1958
DE 2406835 A1 * 8/1975
DE 3726923 C2 * 2/1997 .............. F16F 9/084

(Continued)

*Primary Examiner* — Nicole T Verley
(74) *Attorney, Agent, or Firm* — Honigman LLP; Matthew H. Szalach

(57) ABSTRACT

A suspension system includes an air spring including a flexible bellows having a first chamber configured to hold pressurized air, a second chamber, and an air reservoir configured to hold pressurized air. A control valve is in fluid communication with the first chamber and the air reservoir. The first chamber expands in response to receiving pressurized airflow from the air reservoir via the control valve. An intake valve is in fluid communication with the second chamber and an ambient environment. The second chamber receives airflow from the ambient environment via the intake valve during an expansion stage of a jouncing event. An exhaust valve is in fluid communication with the second chamber and the air reservoir. Airflow is directed from the second chamber toward the air reservoir via the exhaust valve during a compression stage of the jouncing event to at least partially pressurize the air reservoir.

20 Claims, 7 Drawing Sheets

(56) References Cited

U.S. PATENT DOCUMENTS

| | | | | |
|---|---|---|---|---|
| 2024/0066940 A1 * | 2/2024 | Dhaens | .................. | F16F 9/049 |

FOREIGN PATENT DOCUMENTS

| | | | | | |
|---|---|---|---|---|---|
| DE | 202024100108 | U1 * | 2/2024 | ........... | B60G 17/052 |
| EP | 1457362 | A2 * | 9/2004 | ......... | B60G 17/0521 |
| EP | 2236325 | B1 * | 10/2015 | ......... | B60G 17/0155 |
| EP | 4596264 | A1 * | 8/2025 | ............... | B60G 3/10 |
| HU | 174666 | B * | 3/1980 | .............. | F16F 9/084 |
| JP | S61135808 | A * | 6/1986 | | |
| WO | WO-03029687 | A1 * | 4/2003 | .............. | F16F 9/084 |

* cited by examiner

SELF-PRESSURIZING AIR SUSPENSION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to air suspension systems, and in particular to vehicular air suspension systems that utilize vertical movement of the vehicle or jouncing to pressurize the air suspension system.

Typically, vehicular air suspension systems include air springs that support the vehicle body or frame relative to individual wheels of the vehicle. The air springs include flexible bellows mounted between the vehicle body or frame and the wheels. An electrically powered air compressor pressurizes the air springs and may be configured to increase and decrease the pressure within the bellows to increase and decrease the ride height of the vehicle body or frame relative to the wheels. Although air suspension systems may provide good shock absorption qualities and the ability to adjust the ride height of the vehicle, operation of the air compressor can be noisy and consume a substantial amount of energy. Additionally, vehicle packaging constraints for placement of the air compressor and integration of the air compressor into the vehicle wiring harness must be considered. Further, the air compressor may increase materials costs and maintenance costs, and requires an integrated controller.

SUMMARY

One aspect of the disclosure provides a suspension system. The suspension system includes an air spring including a flexible bellows having a first chamber configured to hold pressurized air and a second chamber. An air reservoir is configured to hold pressurized air. A control valve is in fluid communication with the first chamber of the bellows and the air reservoir. The first chamber of the bellows expands in response to receiving pressurized airflow from the air reservoir via the control valve. An intake valve is in fluid communication with the second chamber of the bellows and an ambient environment. The second chamber receives airflow from the ambient environment via the intake valve during an expansion stage of a jouncing event. An exhaust valve is in fluid communication with the second chamber of the bellows and the air reservoir. Airflow is directed from the second chamber toward the air reservoir via the exhaust valve during a compression stage of the jouncing event to at least partially pressurize the air reservoir.

Implementations of the disclosure may include one or more of the following optional features. In some implementations, the first chamber of the bellows contracts in response to directing pressurized airflow toward the air reservoir via the control valve. In further implementations, the suspension system further includes a control module operable to direct pressurized airflow between the air reservoir and the control valve to cause expansion and compression of the first chamber of the bellows.

In some examples, the exhaust valve directs airflow from the second chamber toward the air reservoir in response to air pressure within the second chamber being greater than a threshold level during the jouncing event. In some aspects, the air reservoir is in fluid communication with a pressure relief valve. The pressure relief valve directs airflow from the air reservoir toward the ambient environment in response to air pressure within the air reservoir being greater than a threshold level. In some implementations, the intake valve directs airflow from the second chamber toward the ambient environment in response to air pressure within the second chamber being greater than a threshold level during the jouncing event.

In some examples, the air spring is mounted between a first element and a second element. The first chamber expands to increase a distance between the first element and the second element and the first chamber contracts to decrease the distance between the first element and the second element. In further examples, the suspension system further includes a biasing element. The biasing element urges the first element and the second element away from one another. In even further examples, the biasing element includes a coil spring disposed between the first element and the second element and outboard of the bellows of the air spring. In other further examples, the first element includes a body of a vehicle and the second element includes a wheel of the vehicle.

Another aspect of the disclosure provides a vehicular suspension system. The vehicular suspension system includes a first mounting element configured to attach to a body of a vehicle equipped with the vehicular suspension system. A second mounting element is configured to attach to a wheel of the vehicle. An air spring includes a flexible bellows having a first chamber configured to hold pressurized air and a second chamber. An air reservoir is configured to hold pressurized air. A control valve is in fluid communication with the first chamber of the bellows and the air reservoir. The first chamber of the bellows expands in response to receiving pressurized airflow from the air reservoir via the control valve. An intake valve is in fluid communication with the second chamber of the bellows and an ambient environment. The second chamber receives airflow from the ambient environment via the intake valve during an expansion stage of a jouncing event. An exhaust valve is in fluid communication with the second chamber of the bellows and the air reservoir. Airflow is directed from the second chamber toward the air reservoir via the exhaust valve during a compression stage of the jouncing event to at least partially pressurize the air reservoir. This aspect may include one or more of the following optional features.

In some implementations, the first chamber of the bellows contracts in response to directing pressurized airflow toward the air reservoir via the control valve. In further implementations, the vehicular suspension system further includes a control module operable to direct pressurized airflow between the air reservoir and the control valve to cause expansion and compression of the first chamber of the bellows.

In some examples, the first chamber expands to increase a distance between the first mounting element attached to the body and the second mounting element attached to the wheel. The first chamber contracts to decrease the distance between the first mounting element attached to the body and the second mounting element attached to the wheel.

In some aspects, the vehicular suspension system further includes a biasing element. The biasing element urges the first mounting element and the second mounting element away from one another.

Yet another aspect of the disclosure provides a vehicle. The vehicle includes a body, a wheel, a first mounting element attached to the body, and a second mounting element attached to the wheel. An air spring includes a flexible bellows having a first chamber configured to hold pressurized air and a second chamber. An air reservoir is configured to hold pressurized air. A control valve is in fluid communication with the first chamber of the bellows and the air reservoir. The first chamber of the bellows expands in response to receiving pressurized airflow from the air reservoir via the control valve. An intake valve is in fluid communication with the second chamber of the bellows and an ambient environment. The second chamber receives airflow from the ambient environment via the intake valve during an expansion stage of a jouncing event. An exhaust valve is in fluid communication with the second chamber of the bellows and the air reservoir. Airflow is directed from the second chamber toward the air reservoir via the exhaust valve during a compression stage of the jouncing event to at least partially pressurize the air reservoir. This aspect may include one or more of the following optional features.

In some implementations, the first chamber of the bellows contracts in response to directing pressurized airflow toward the air reservoir via the control valve. In further implementations, the vehicle further includes a control module operable to direct pressurized airflow between the air reservoir and the control valve to cause expansion and compression of the first chamber of the bellows.

In some examples, the first chamber expands to increase a distance between the first mounting element attached to the body and the second mounting element attached to the wheel. The first chamber contracts to decrease the distance between the first mounting element attached to the body and the second mounting element attached to the wheel.

In some aspects, the vehicle further includes a biasing element. The biasing element urges the first mounting element and the second mounting element away from one another.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
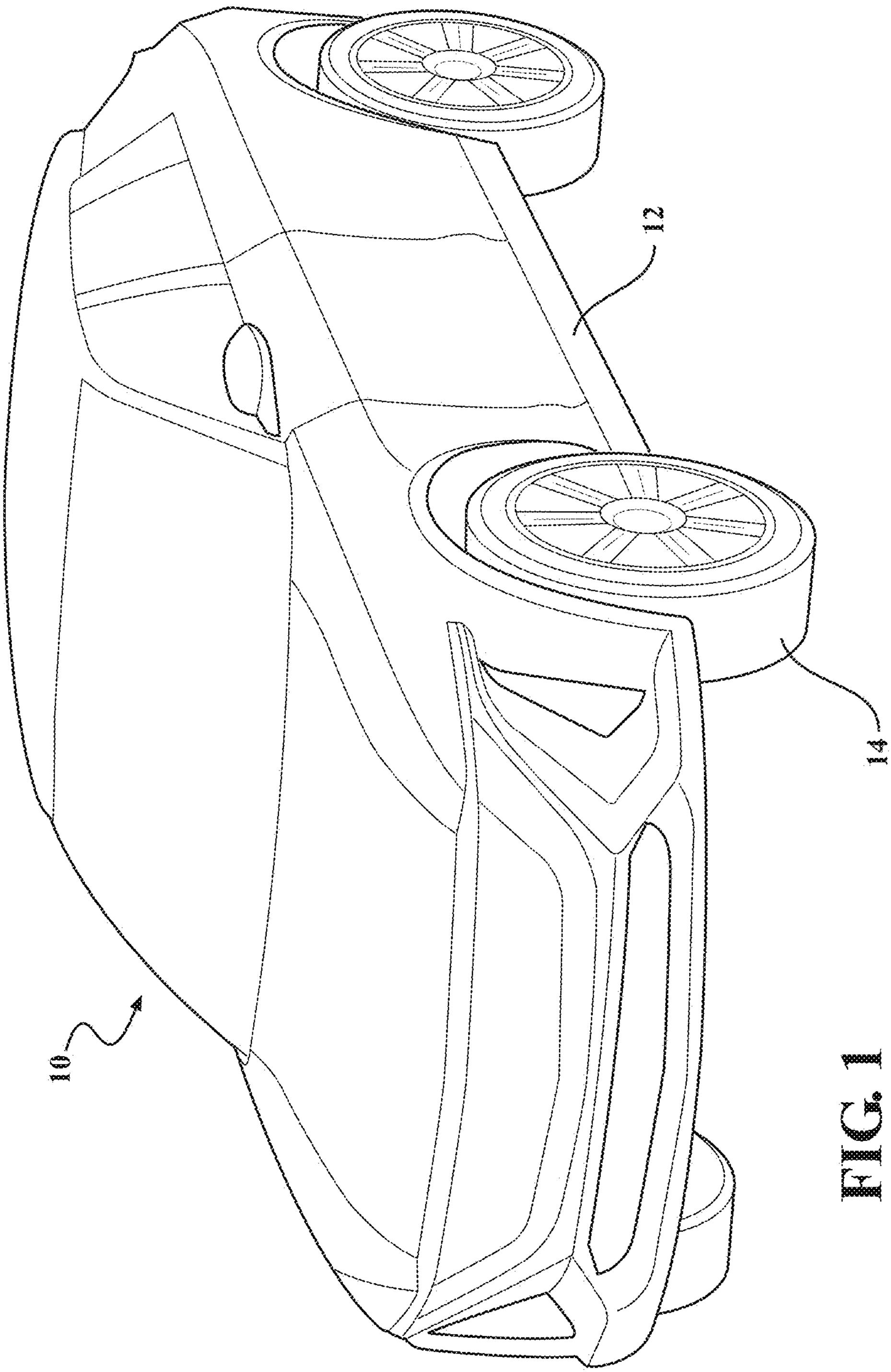
FIG. 1 is a perspective view of a vehicle equipped with a self-pressurizing air suspension system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
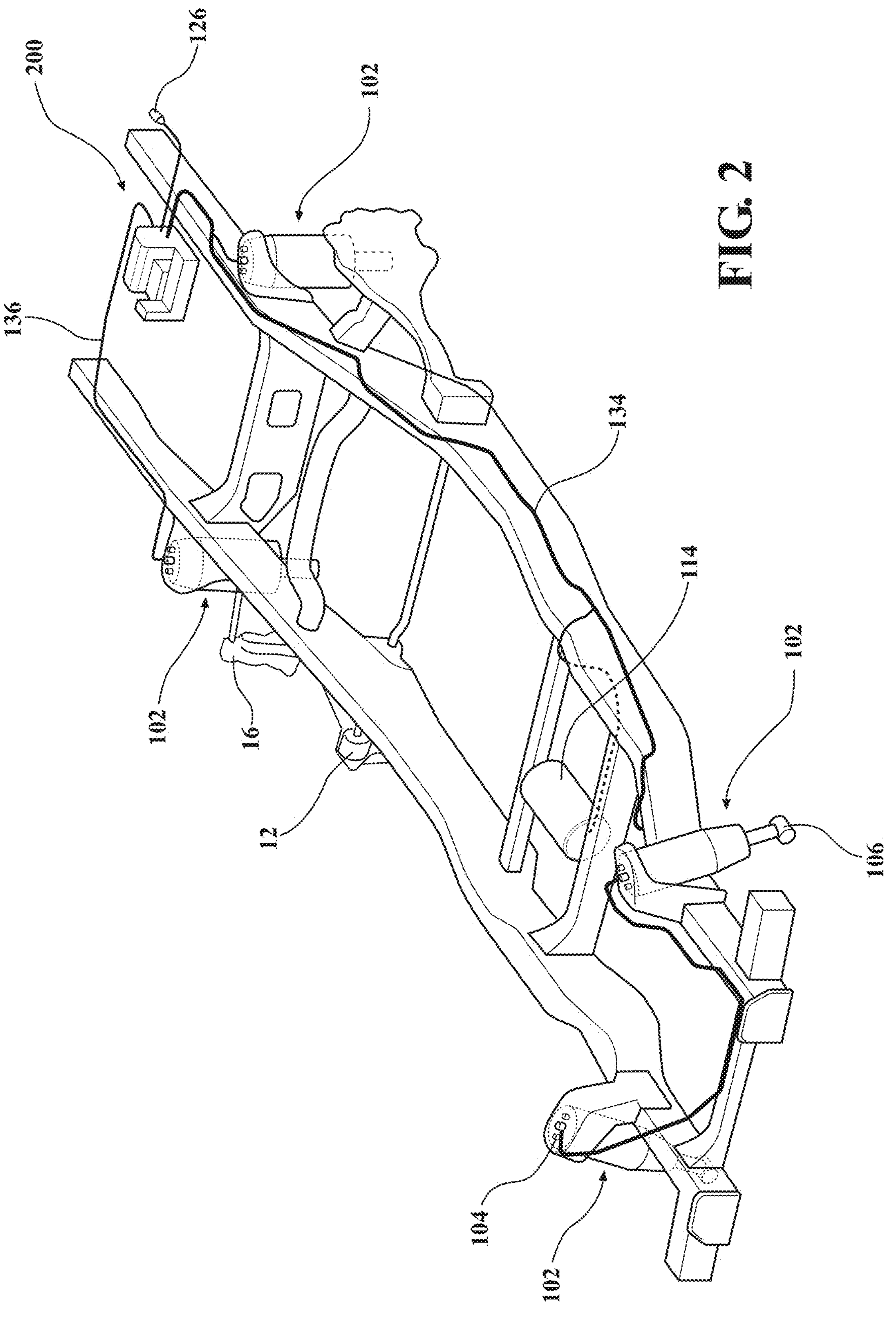
FIG. 2 is a perspective view of a frame of the vehicle and elements of the self-pressurizing air suspension system.

Referring now to the figures and the illustrated configurations depicted therein, a vehicle 10 includes a suspension system 100, and more particularly an air suspension system 100, that supports a frame or body 12 of the vehicle 10 relative to individual wheels 14 of the vehicle 10 (FIGS. 1 and 2). That is, the air suspension system 100 enables vertical movement of the wheels 14 of the vehicle 10 relative to the body 12 as the vehicle 10 travels along the road and absorbs or attenuates vibrations or shocks from travelling from the wheels 14 through the suspension system 100 to the body 12 of the vehicle 10. Further, the air suspension system 100 allows for adjustment of a ride height of the vehicle 10 (i.e., a height of the body 12 of the vehicle 10 relative to the ground surface) and adjustment of the stiffness or shock absorbing abilities of the suspension system 100. This provides a smooth or more comfortable ride for occupants of the vehicle 10 and better load-levelling capabilities. As discussed further below, the air suspension system 100 is self-pressurizing to reduce or eliminate the need for an electrically operable air compressor to pressurize and/or adjust the pressure of an air reservoir 114 of the air suspension system 100.

Figure 3:
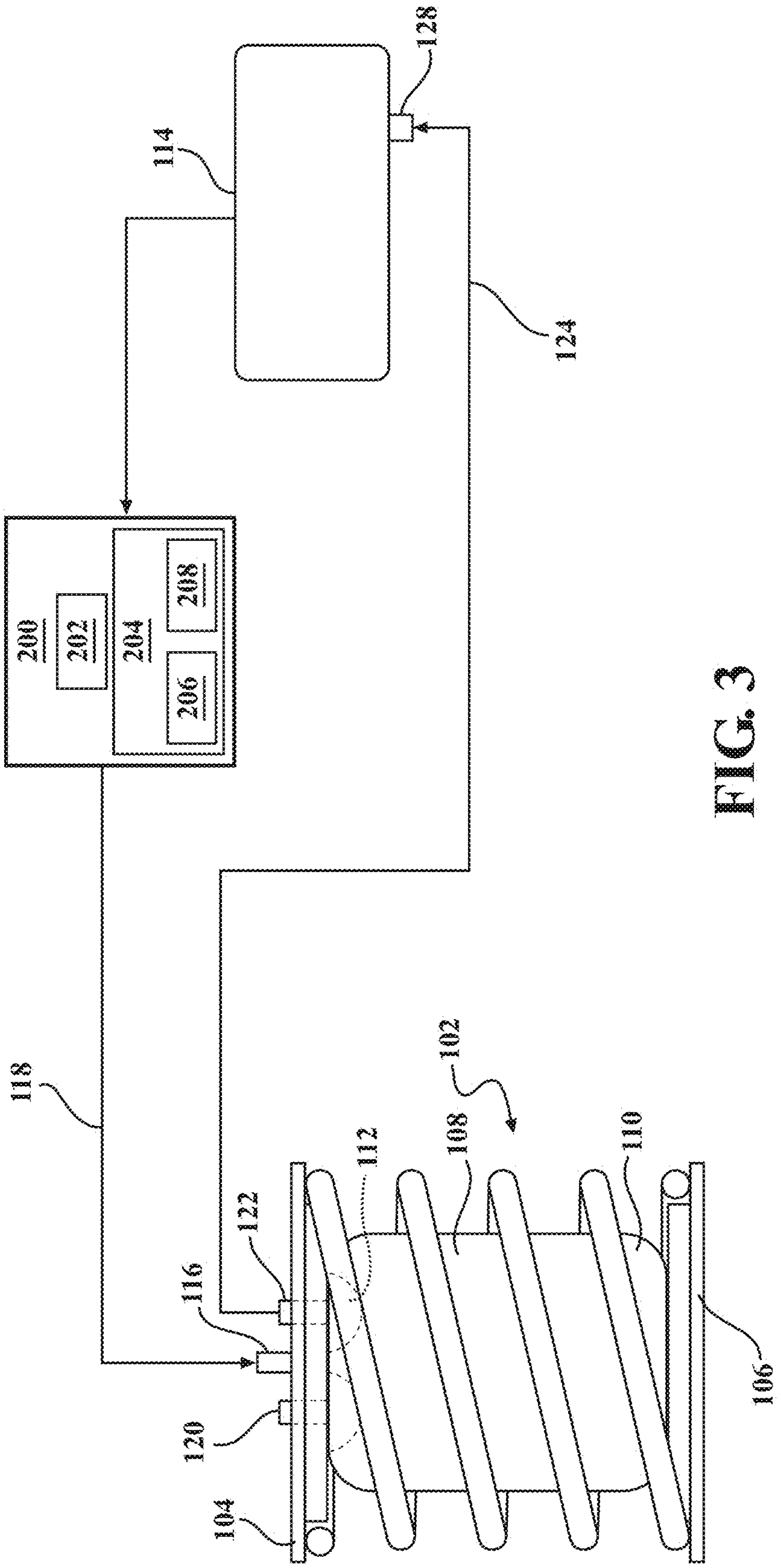
FIG. 3 is a schematic view of the self-pressurizing air suspension system.

Referring to FIGS. 2 and 3, the suspension system 100 includes an air spring 102 at each individual wheel position 14 of the vehicle 10. For example, the air spring 102 is disposed between a first mounting plate 104 attached to the body 12 of the vehicle 10 and a second mounting plate 106 attached to the wheel 14 of the vehicle 10. The air spring 102 includes a flexible bellows 108 having a first chamber 110 and a second chamber 112 that are each configured to hold air and that are separate and distinct from one another. In other words, the first chamber 110 and the second chamber 112 do not fluidly communicate with one another. The first chamber 110 provides a main or primary chamber of the bellows 108 that holds pressurized air for setting the ride height of the vehicle 10 and at least partially attenuating or absorbing vibrations and shocks from travelling between the second mounting plate 106 attached to the wheel 14 and the first mounting plate 104 attached to the vehicle body 12. The second chamber 112 is configured to intake ambient air and direct airflow to the air reservoir 114 of the system 100 for at least partially pressurizing the air reservoir 114. In the illustrated example, the second chamber 112 is defined by one or more sacks or pouches extending at least partially within the first chamber 110 and disposed adjacent to an upper end of the flexible bellows 108 at or near the first mounting plate 104.

The air reservoir 114 includes a tank or container that is configured to hold pressurized air and that is disposed remote from the air spring 102. In the illustrated example, the suspension system 100 includes one singular air reservoir 114 in fluid communication with all air springs 102 of the vehicle 10. In other examples, each air spring 102 is in fluid communication with an individual and/or dedicated air reservoir 114 (e.g., disposed at or near the individual wheel 14 attached to the air spring 102). Optionally, the system 100 includes air reservoirs 114 in fluid communication with multiple air springs 102. For example, the system 100 includes a first air reservoir 114 in fluid communication with forward air springs 102 attached to the front wheels 14 of the vehicle 10 and a second air reservoir 114 in fluid communication with rearward air springs 102 attached to the rear wheels 14 of the vehicle 10. Alternatively, the first air reservoir 114 is in fluid communication with driver-side air springs 102 attached to the driver-side wheels 14 of the vehicle 10 and the second air reservoir 114 is in fluid communication with passenger-side air springs 102 attached to the passenger-side wheels 14 of the vehicle 10. In some implementations air springs 102 are equipped at less than all of the wheels 14 of the vehicle 10, such as only at front wheels 14 to provide nose lift for the vehicle 10 or only at rear wheels 14 to provide load leveling. Other configurations are possible.

Figure 4:
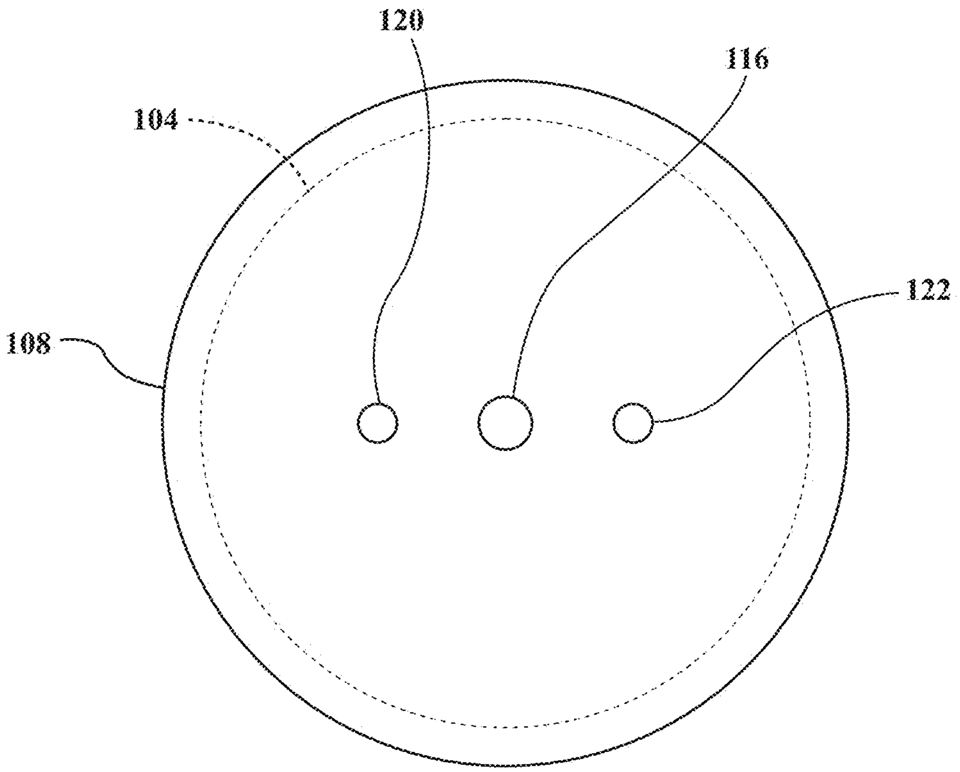
FIG. 4 is a top end view of an air spring of the self-pressurizing air suspension system.

A first valve or a control valve 116 is in fluid communication between the first chamber 110 of the bellows 108 and the air reservoir 114. For example, the control valve 116 is disposed at an upper end of the bellows 108 (and may extend through the first mounting plate 104, as shown in FIG. 4) and is connected to a first air conduit 118 connected to the air reservoir 114. Airflow travels between the air reservoir 114 and the first chamber 110 via the first air conduit 118 and the control valve 116 for increasing or decreasing an air pressure within the first chamber 110 and/or expanding or contracting the bellows 108.

A second valve or an intake valve 120 is in fluid communication between the second chamber 112 of the bellows 108 and an ambient exterior environment. For example, the intake valve 120 is disposed at the upper end of the bellows 108 spaced from the control valve 116 (and may extend through the first mounting plate 104, as shown in FIG. 4). Ambient airflow is received into the second chamber 112 from the ambient environment via the intake valve 120. In some examples, airflow may be expelled or exhausted or released from the second chamber 112 to the ambient environment via the intake valve 120 in response to pressure within the second chamber 112 being greater than a first threshold pressure, such as greater than or equal to about 15 bar, greater than or equal to about 17.5 bar, greater than or equal to about 20 bar, greater than or equal to about 25 bar, and the like.

A third valve or an exhaust valve 122 is in fluid communication between the second chamber 112 of the bellows 108 and the air reservoir 114. For example, the exhaust valve 122 is disposed at the upper end of the bellows 108 spaced from the control valve 116 and the intake valve 120 (and may extend through the first mounting plate 104, as shown in FIG. 4) and is connected to a second air conduit 124 connected to the air reservoir 114 separate and distinct from the first air conduit 118. Airflow is directed from the second chamber 112 toward the air reservoir 114 via the exhaust valve 122 and the second air conduit 124 for at least partially pressurizing the air reservoir 114. In some examples, airflow is expelled or exhausted or released or directed from the second chamber 112 to the air reservoir 114 via the exhaust valve 122 and the second air conduit 124 in response to pressure within the second chamber 112 being greater than a second threshold pressure that is less than the first threshold pressure, such as greater than or equal to about 2 bar, greater than or equal to about 5 bar, greater than or equal to about 10 bar, and the like. The exhaust valve 122 includes a booster valve configured to increase flow rate from the second chamber 112 to the air reservoir 114 along the second air conduit 124 as air pressure within the air reservoir 114 and/or second air conduit 124 may be greater than pressure within the second chamber 112.

Figure 5:
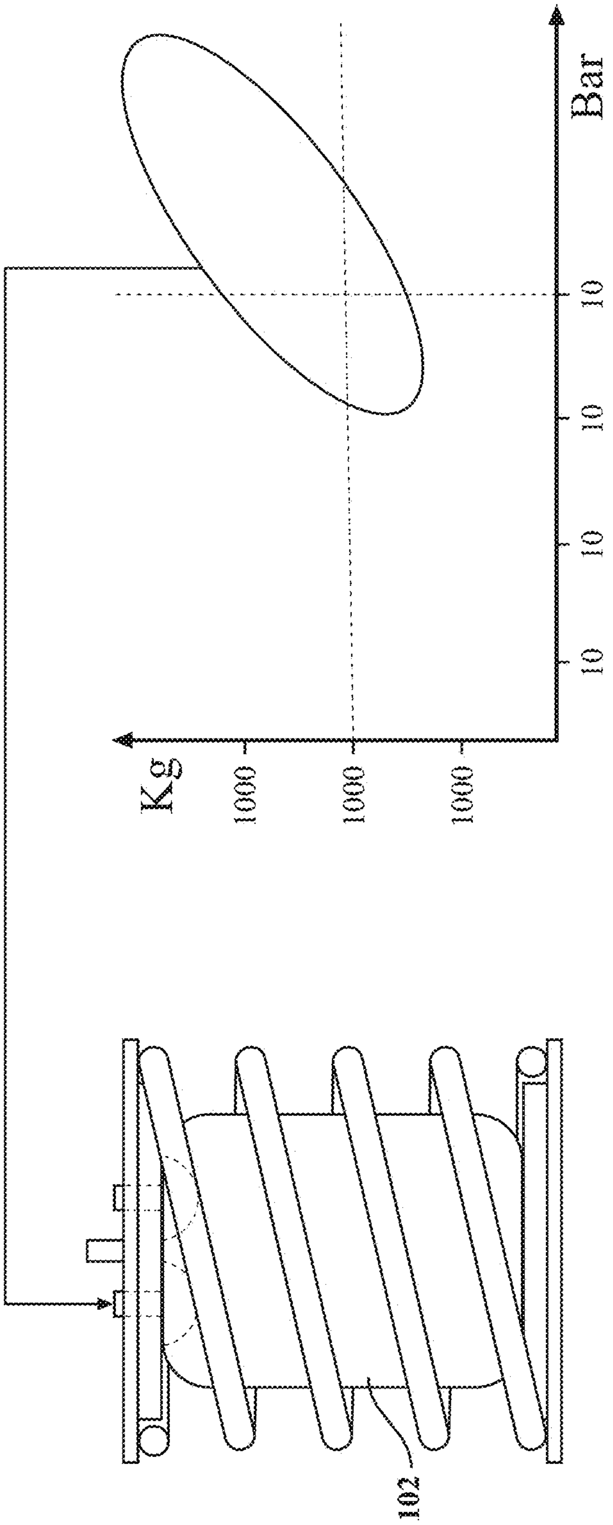
FIG. 5 is a schematic view of the air spring of the self-pressurizing air suspension system and a chart showing example air pressure generated by the air spring and showing elimination of over pressurization of the air spring during a jouncing event.
Figure 6:
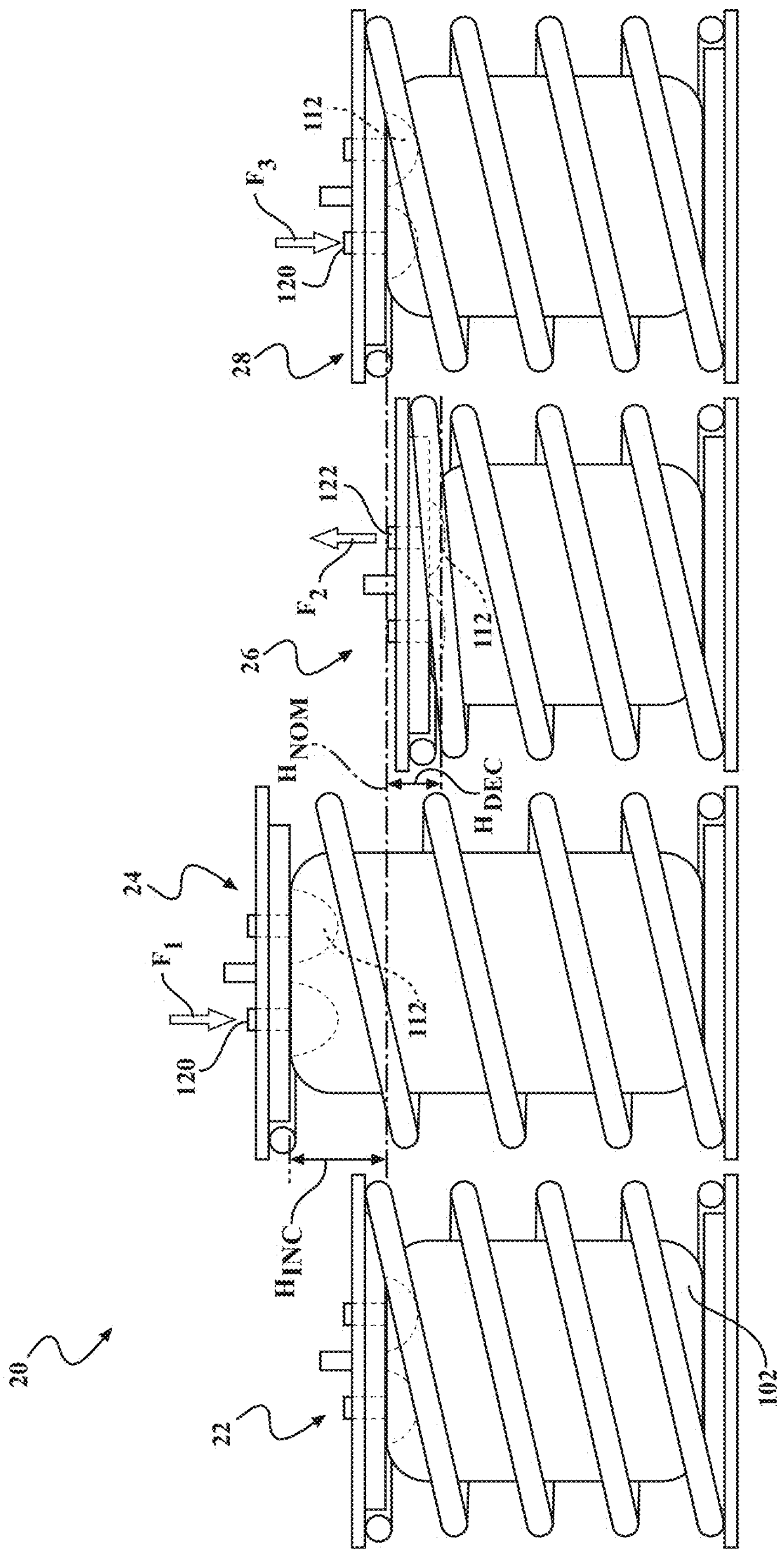
FIG. 6 is a schematic view of the air spring of the self-pressurizing air suspension system during the jouncing event.

As shown in FIGS. 5 and 6, during a jouncing event 20, the bellows 108 of the air spring 102 expands and contracts relative to a nominal volume (in the illustrated example, represented as a height $H_{NOM}$ of the air spring 102 or distance between the first mounting plate 104 and the second mounting plate 106). That is, relative to a current ride height of the vehicle 10, the wheel 14 may move away from and toward the body 12 of the vehicle 10 as the vehicle 10 travels along the road (i.e., the jouncing event 20), such as due to bumps or undulations in the road surface or an increase or decrease in a grade of the road. Because the wheel 14 is attached to the second mounting plate 106 at the second or lower end of the bellows 108 and the body 12 is attached to the first mounting plate 104 at the first or upper end of the bellows 108, this movement causes the bellows 108 to expand and contract according to relative movement of the wheel 14 and body 12. For example, during the jouncing event 20, the wheel 14 and the second mounting plate 106 may move vertically relative to the body 12 and the first mounting plate 104 by up to 100 millimeters or more, such as due to about 2,000 kilograms to about 3,000 kilograms or more of load being applied to for a time period of about 200 milliseconds to about 300 milliseconds. The air spring 102 is configured to convert this energy into pressurizing the air reservoir 114 via the second chamber 112 of the bellows 108. For example, air pressure of up to 30 bar or more may be generated via the second chamber 112 during the jouncing event 20 (FIG. 5).

That is, during a nominal stage or normal driving condition 22 of the jouncing event 20, the bellows 108 is at a nominal volume or the air spring 102 is at the nominal height $H_{NOM}$. This height $H_{NOM}$ may be adjusted by adjusting the air pressure within the first chamber 110, as discussed further below. As the wheel 14 moves away from the body 12 of the vehicle 10 during an expansion portion or expansion stage 24 of the jouncing event 20, the volume and height of the bellows 108 increases by an amount $H_{INC}$ relative to the nominal height $H_{NOM}$. This causes the second chamber 112 to receive a first airflow $F_1$ of ambient air from the environment via the intake valve 120 during the expansion stage 24. In other words, the second chamber 112 expands together with the first chamber 110 of the bellows 108 as the air spring 102 lengthens to accommodate movement of the wheel 14 away from the body 12, drawing ambient airflow $F_1$ into the second chamber 112 via the intake valve 120. Optionally, the intake valve 120 causes airflow to exit the second chamber 112 to the ambient environment in response to air pressure within the second chamber 112 being greater than the first threshold level (e.g., about 17.5 bar or more), such as to prevent pressure from building within the second chamber 112 too rapidly and to prevent damage to the bellows 108.

During a compression portion or compression stage 26 of the jouncing event 20, the wheel 14 moves toward the body 12 of the vehicle 10, causing the volume and height of the bellows 108 to decreases an amount $H_{DEC}$ relative to the nominal height $H_{NOM}$. In turn, a second airflow $F_2$ is directed from the second chamber 112 toward the air reservoir 114 via the exhaust valve 122 and the second air conduit 124 during the compression stage 26. This second airflow $F_2$ at least partially pressurizes the air reservoir 114 for later use in pressurizing the first chamber 110 and adjusting the nominal ride height $H_{NOM}$. Optionally, the exhaust valve 122 causes airflow to exit the second chamber 112 toward the air reservoir 114 in response to air pressure within the second chamber 112 being greater than the second threshold level (e.g., about 5 bar or more), such to allow pressure to build during successive jouncing events 20 and to prevent the second air conduit 124 from being continuously fluidly coupled to the second chamber 112. As the volume and height of the bellows 108 returns to its nominal level $H_{NOM}$ during a recovery portion or recovery stage 28 of the jouncing event 20, the second chamber 112 receives a third airflow $F_3$ of ambient air from the environment via the intake valve 120 and the second chamber 112 returns to its nominal pressure level.

Thus, the air reservoir 114 is pressurized at least in part by air captured by the second chamber 112 during expansion of the second chamber 112 and directed toward the air reservoir 114 during compression of the second chamber 112. This pressurized air is held in the air reservoir 114 and may be used to adjust the air pressure held in the first chamber 110 of the bellows 108, such as to adjust the nominal ride height $H_{NOM}$ and/or adjust the firmness of the air suspension system 100. In some examples, the intake valve 120 of the air spring 102 is in fluid communication with the ambient environment via a third air conduit or ambient conduit 126. Further, the air reservoir 114 includes a pressure relief valve 128 that releases air from the air reservoir 114 to the ambient environment in response to pressure within the air reservoir 114 being greater than a threshold level, such as greater than about 17.5 bar or more, greater than about 20 bar or more, greater than about 40 bar or more, and the like. The pressure relief valve 128 may vent air to the ambient conduit 126.

Figure 7:
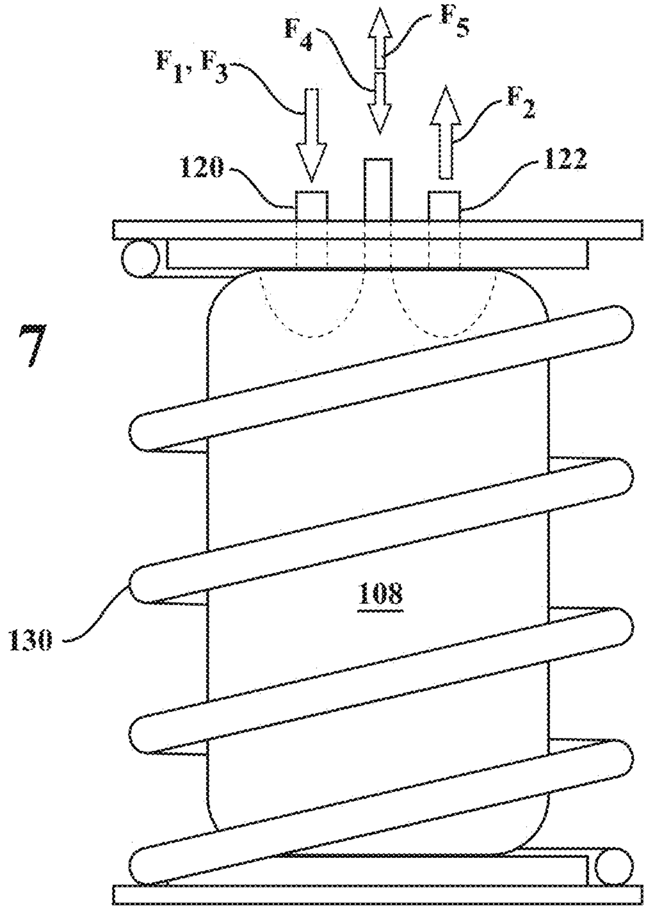
FIG. 7 is a schematic view of the air spring of the self-pressurizing air suspension system with a biasing element disposed about a bellows of the air spring.

As shown in FIG. 7, the air spring 102 includes a biasing element 130 disposed between the first mounting plate 104 and the second mounting plate 106. The biasing element 130 urges the first mounting plate 104 and the second mounting plate 106 away from one another, such as to encourage expansion of the bellows 108. In the illustrated example, the biasing element 130 includes a coil spring disposed outboard of the bellows 108. Further, the biasing element 130 may at least partially attenuate vibrations or shocks from travelling between the wheel 14 attached to the second mounting plate 106 and the body 12 attached to the first mounting plate 104.

In some examples, at least a portion of the upper end of the bellows 108 may vertically translate relative to the first mounting plate 104 during the jouncing event 20. Thus, one or more of the control valve 116, the intake valve 120, and the exhaust valve 122 may be fluidly coupled to the respective chamber 110, 112 via a twisted spring type air line or conduit.

Referring to FIGS. 2 and 3, an air supply unit (ASU) 200 is in fluid communication between the air reservoir 114 and the control valve 116 of the air spring 102 for controlling airflow between the first chamber 110 and the air reservoir 114 to adjust the nominal ride height $H_{NOM}$ and/or adjust the firmness of the air suspension system 100. The ASU 200 includes a valve 202, such as an adjustable bidirectional valve, that permits a pressurized fourth airflow $F_4$ from the air reservoir 114 toward the control valve 116 and the first chamber 110 via the first air conduit 118 and permits a pressurized fifth airflow $F_5$ from the first chamber 110 and control valve 116 toward the air reservoir 114 via the first air conduit 118 (FIG. 7).

In the illustrated example, the ASU 200 is inline with the first air conduit 118 between the singular air reservoir 114 and each individual air spring 102. For example, a first portion 134 of the first air conduit 118 fluidly couples between the air reservoir 114 and the ASU 200 and respective second portions 136 of the first air conduit 118 fluidly couple between the ASU 200 and the individual air springs 102. In this example, the ASU 200 may include respective valves 202 fluidly connecting the first portion 134 of the first air conduit 118 to each individual second portion 136 of the first air conduit 118. In other examples, the air spring system 100 includes respective ASUs 200 and air reservoirs 114 corresponding to individual air springs 102 or pairs of air springs 102.

Moreover, the ASU 200 includes or is in communication with (e.g., wireless communication or via a bus network of the vehicle 10) an electronic control unit (ECU) or control module 204 having electronic circuitry and associated software for operating the system 100. Specifically, the control module 204 includes data processing hardware 206 and memory hardware 208 in communication with the data processing hardware 206. The memory hardware 208 stores instructions that, when executed on the data processing hardware 206, cause the data processing hardware 206 to perform operations. For example and as discussed further below, the control module 204 stores instructions for operating the valve 202 of the ASU 200 to adjust air pressure within the first chamber 110 of the air spring 102.

Figure 8:
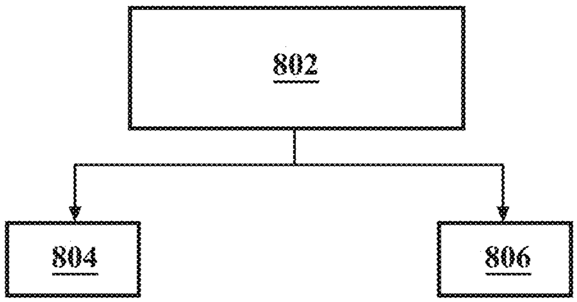
FIG. 8 is a flowchart of an exemplary arrangement of operations for a method of operating the self-pressurizing air suspension system to adjust air pressure within the bellows of the air spring utilizing air pressure generated by the self-pressurizing air suspension system.

FIG. 8 provides a flowchart of an exemplary arrangement of operations for a method 800 of operating the air suspension system 100. The control module 204 may perform operations for the method 800. At operation 802, the method 800 includes receiving a signal for adjusting the air pressure (and thus the nominal ride height $H_{NOM}$) of the air spring 102. In some examples, the signal is received from a position sensor 16 disposed at the vehicle 10 (FIG. 2). Position sensors 16 may be disposed at or near each wheel 14 of the vehicle 10 and transmit signals representative of the current ride height of the body 12 relative to the ground surface. Based on the signal from the position sensor 16, the ASU 200 controls operation of the valve 202 to direct the fourth flow $F_4$ from the air reservoir 114 to the first chamber 110 or to direct the fifth flow $F_5$ from the first chamber 110 to the air reservoir 114. For example, the ASU 200 may provide ride leveling capabilities and adjust the pressure at the respective air springs 102 based on detecting different ride heights at the respective wheels 14 (e.g., indicating a non-level road surface). In some examples, the signal is received from a user input, such as to select a desired ride height and/or adjust the ride height based on a selected driving mode of the vehicle 10.

Based on receiving a signal at operation 802 indicating that ride height of the vehicle 10 and/or the firmness of the air suspension system 100 should be increased, the method 800 includes at operation 804 operating the ASU 200 to direct the fourth flow $F_4$ toward the air spring 102. Directing the fourth flow $F_4$ from the air reservoir 114 to the first chamber 110 of the bellows 108 via the control valve 116 causes the pressure within the first chamber 110 to increase, which may increase the ride height by causing the bellows 108 to expand and/or increase the firmness of the air suspension system 100.

Based on receiving a signal at operation 802 indicating that ride height of the vehicle 10 and/or the firmness of the air suspension system 100 should be decreased, the method 800 includes at operation 806 operating the ASU 200 to direct the fifth flow $F_5$ toward the air reservoir 114. Directing the fifth flow $F_5$ from the first chamber 110 of the bellows 108 through the control valve 116 to the air reservoir 114 causes the pressure within the first chamber 110 to decrease, which may decrease the ride height by causing the bellows 108 to contract or compress and/or decrease the firmness of the air suspension system 100.

Thus, the air suspension system 100 utilizes an air spring 102 with a secondary chamber 112 that draws ambient airflow $F_1$ when the air spring 102 is extended and charges airflow $F_2$ to the air reservoir 114 when the air spring 102 is compressed or depressed while the vehicle 10 is driving. This may negate the need for an air compressor connected to the system while maintaining the ability for the user to adjust the ride height and/or firmness of the air suspension system 100, resulting in reduced noise and improved maintenance and installation costs. Further, vehicle packaging of the air suspension system 100 is improved.

Optionally, the system 100 includes a supplementary air compressor that at least partially pressurizes the air reservoir 114. Because of the self-pressurizing features of the system 100, the supplementary air compressor operates less frequently and may be configured to maintain a minimum air pressure within the air reservoir 114, such as to ensure continuous ability to adjust the ride height of the vehicle 10.

Although shown and described herein as equipped at a vehicle 10 (e.g., a passenger vehicle like a sedan, coupe, SUV, truck, RV, ambulance, fire truck, and the like), it should be understood that the air suspension system 100 may be utilized by a variety of different applications. For example, the air suspension system 100 may be utilized by commercial vehicles, such as cargo trucks, busses, construction vehicles like bulldozers, and the like. In some examples, the air suspension system 100 may be utilized by aircraft, trailers, rollercoasters, industrial machinery, and the like.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A suspension system comprising:

an air spring including a flexible bellows having a first chamber configured to hold pressurized air and a second chamber;

an air reservoir configured to hold pressurized air;

a control valve in fluid communication with the first chamber of the bellows and the air reservoir, the first chamber of the bellows expanding in response to receiving pressurized airflow from the air reservoir via the control valve;

an intake valve in fluid communication with the second chamber of the bellows and an ambient environment, the second chamber receiving airflow from the ambient environment via the intake valve during an expansion stage of a jouncing event; and an exhaust valve in fluid communication with the second chamber of the bellows and the air reservoir, airflow directed from the second chamber toward the air reservoir via the exhaust valve during a compression stage of the jouncing event to at least partially pressurize the air reservoir.

2. The suspension system of claim 1, wherein the first chamber of the bellows contracts in response to directing pressurized airflow toward the air reservoir via the control valve.

3. The suspension system of claim 2, further comprising a control module operable to direct pressurized airflow between the air reservoir and the control valve to cause expansion and compression of the first chamber of the bellows.

4. The suspension system of claim 1, wherein the exhaust valve directs airflow from the second chamber toward the air reservoir in response to air pressure within the second chamber being greater than a threshold level during the jouncing event.

5. The suspension system of claim 1, wherein the air reservoir is in fluid communication with a pressure relief valve, the pressure relief valve directing airflow from the air reservoir toward the ambient environment in response to air pressure within the air reservoir being greater than a threshold level.

6. The suspension system of claim 1, wherein the intake valve directs airflow from the second chamber toward the ambient environment in response to air pressure within the second chamber being greater than a threshold level during the jouncing event.

7. The suspension system of claim 1, wherein the air spring is mounted between a first element and a second element, the first chamber expanding to increase a distance between the first element and the second element and the first chamber contracting to decrease the distance between the first element and the second element.

8. The suspension system of claim 7, further comprising a biasing element, the biasing element urging the first element and the second element away from one another.

9. The suspension system of claim 8, wherein the biasing element includes a coil spring disposed between the first element and the second element and outboard of the bellows of the air spring.

10. The suspension system of claim 7, wherein the first element includes a body of a vehicle and the second element includes a wheel of the vehicle.

11. A vehicular suspension system comprising:

a first mounting element configured to attach to a body of a vehicle equipped with the vehicular suspension system;

a second mounting element configured to attach to a wheel of the vehicle;

an air spring including a flexible bellows having a first chamber configured to hold pressurized air and a second chamber;

an air reservoir configured to hold pressurized air;

a control valve in fluid communication with the first chamber of the bellows and the air reservoir, the first chamber of the bellows expanding in response to receiving pressurized airflow from the air reservoir via the control valve;

an intake valve in fluid communication with the second chamber of the bellows and an ambient environment, the second chamber receiving airflow from the ambient environment via the intake valve during an expansion stage of a jouncing event; and an exhaust valve in fluid communication with the second chamber of the bellows and the air reservoir, airflow directed from the second chamber toward the air reservoir via the exhaust valve during a compression stage of the jouncing event to at least partially pressurize the air reservoir.

12. The vehicular suspension system of claim 11, wherein the first chamber of the bellows contracts in response to directing pressurized airflow toward the air reservoir via the control valve.

13. The vehicular suspension system of claim 12, further comprising a control module operable to direct pressurized airflow between the air reservoir and the control valve to cause expansion and compression of the first chamber of the bellows.

14. The vehicular suspension system of claim 11, wherein the first chamber expands to increase a distance between the first mounting element attached to the body and the second mounting element attached to the wheel, and the first chamber contracts to decrease the distance between the first mounting element attached to the body and the second mounting element attached to the wheel.

15. The vehicular suspension system of claim 11, further comprising a biasing element, the biasing element urging the first mounting element and the second mounting element away from one another.

16. A vehicle comprising:

a body;

a wheel;

a first mounting element attached to the body;

a second mounting element attached to the wheel;

an air spring including a flexible bellows having a first chamber configured to hold pressurized air and a second chamber;

an air reservoir configured to hold pressurized air;

a control valve in fluid communication with the first chamber of the bellows and the air reservoir, the first chamber of the bellows expanding in response to receiving pressurized airflow from the air reservoir via the control valve;

an intake valve in fluid communication with the second chamber of the bellows and an ambient environment, the second chamber receiving airflow from the ambient environment via the intake valve during an expansion stage of a jouncing event; and an exhaust valve in fluid communication with the second chamber of the bellows and the air reservoir, airflow directed from the second chamber toward the air reservoir via the exhaust valve during a compression stage of the jouncing event to at least partially pressurize the air reservoir.

17. The vehicle of claim 16, wherein the first chamber of the bellows contracts in response to directing pressurized airflow toward the air reservoir via the control valve.

18. The vehicle of claim 17, further comprising a control module operable to direct pressurized airflow between the air reservoir and the control valve to cause expansion and compression of the first chamber of the bellows.

19. The vehicle of claim 16, wherein the first chamber expands to increase a distance between the first mounting element attached to the body and the second mounting element attached to the wheel, and the first chamber contracts to decrease the distance between the first mounting element attached to the body and the second mounting element attached to the wheel.

20. The vehicle of claim 16, further comprising a biasing element, the biasing element urging the first mounting element and the second mounting element away from one another.

* * * * *